United States Patent
Ren et al.

(10) Patent No.: US 8,811,045 B2
(45) Date of Patent: Aug. 19, 2014

(54) CIRCUITS AND METHODS FOR CONTROLLING POWER CONVERTERS INCLUDING TRANSFORMERS

(75) Inventors: Zhimou Ren, Chengdu (CN); Ching-Chuan Kuo, Taipei (TW); Jianlong Gao, Chengdu (CN); Xinmin Yi, Chengdu (CN); Yunning Xie, Chengdu (CN)

(73) Assignee: 02Micro, Inc., Santa Clara, CA (US)

(*) Notice: Subject to any disclaimer, the term of this patent is extended or adjusted under 35 U.S.C. 154(b) by 268 days.

(21) Appl. No.: 13/443,786

(22) Filed: Apr. 10, 2012

(65) Prior Publication Data

US 2012/0243269 A1     Sep. 27, 2012

Related U.S. Application Data

(63) Continuation-in-part of application No. 12/712,407, filed on Feb. 25, 2010, now Pat. No. 8,379,413.

(30) Foreign Application Priority Data

Dec. 25, 2009 (CN) .......................... 2009 1 0265547
Feb. 21, 2012 (CN) .......................... 2012 1 0044383

(51) Int. Cl.
    *H02M 3/335*     (2006.01)

(52) U.S. Cl.
    CPC ................................. *H02M 3/33507* (2013.01)
    USPC .................................... 363/21.16; 363/21.12

(58) Field of Classification Search
    CPC .................... H02M 2001/0003; H02M 3/335
    USPC ..................... 363/21.12, 21.13, 21.16, 21.18
    See application file for complete search history.

(56) References Cited

U.S. PATENT DOCUMENTS

| | | | |
|---|---|---|---|
| 4,724,363 A | 2/1988 | Buer | |
| 5,909,363 A | 6/1999 | Yoon | |
| 5,991,170 A | 11/1999 | Nagai et al. | |
| 6,208,533 B1 | 3/2001 | Ogawa | |
| 6,396,718 B1 | 5/2002 | Ng et al. | |
| 6,515,876 B2 | 2/2003 | Koike et al. | |
| 7,310,244 B2 | 12/2007 | Yang et al. | |
| 7,394,209 B2 | 7/2008 | Lin et al. | |
| 7,433,210 B2 | 10/2008 | Meitzner et al. | |
| 7,697,308 B2 | 4/2010 | Huynh et al. | |
| 8,045,344 B2 | 10/2011 | Grant | |
| 8,379,413 B2 * | 2/2013 | Ren et al. ................... | 363/21.12 |
| 2009/0073725 A1 * | 3/2009 | Lin ................................. | 363/19 |
| 2010/0172158 A1 | 7/2010 | Sato et al. | |

FOREIGN PATENT DOCUMENTS

JP     2008312335 A     12/2008
WO     2008054083 A1     5/2008

* cited by examiner

*Primary Examiner* — Harry Behm
*Assistant Examiner* — Matthew Grubb (57) ABSTRACT

A circuit includes a transformer and a controller. The transformer includes a primary winding and a secondary winding, and operates in multiple switching cycles. A switching cycle includes a charging period and a discharging period. During the charging period, the transformer is powered by the input voltage and a current flowing through the primary winding increases. During the discharging period the transformer discharges to power the load and a current flowing through the secondary winding decreases. The controller includes a pin that receives a first feedback signal indicating the input voltage during the charging period and receives a second feedback signal indicating an electrical condition of the secondary winding during the discharging period. The controller generates a first control signal and a second control signal to regulate the input voltage and an output current flowing through the load, respectively.

25 Claims, 9 Drawing Sheets

CIRCUITS AND METHODS FOR CONTROLLING POWER CONVERTERS INCLUDING TRANSFORMERS

RELATED APPLICATION

This application is a continuation-in-part of the co-pending U.S. application Ser. No. 12/712,407, entitled "Circuits and Methods for Controlling Power Converters including Transformers," filed on Feb. 25, 2010, which itself claims priority to Chinese Patent Application No. 200910265547.3, entitled "Circuits and Methods for Controlling Power Converters Including Transformers," filed on Dec. 25, 2009, with the State Intellectual Property Office of the People's Republic of China, both of which are hereby incorporated by reference in its entirety. This application also claims priority to Chinese Patent Application No. 201210044383.3, entitled "Circuit for Driving Load, Power Converter and Controller," filed on Feb. 21, 2012, with the State Intellectual Property Office of the People's Republic of China, which is hereby incorporated by reference in its entirety.

BACKGROUND

Figure 1:
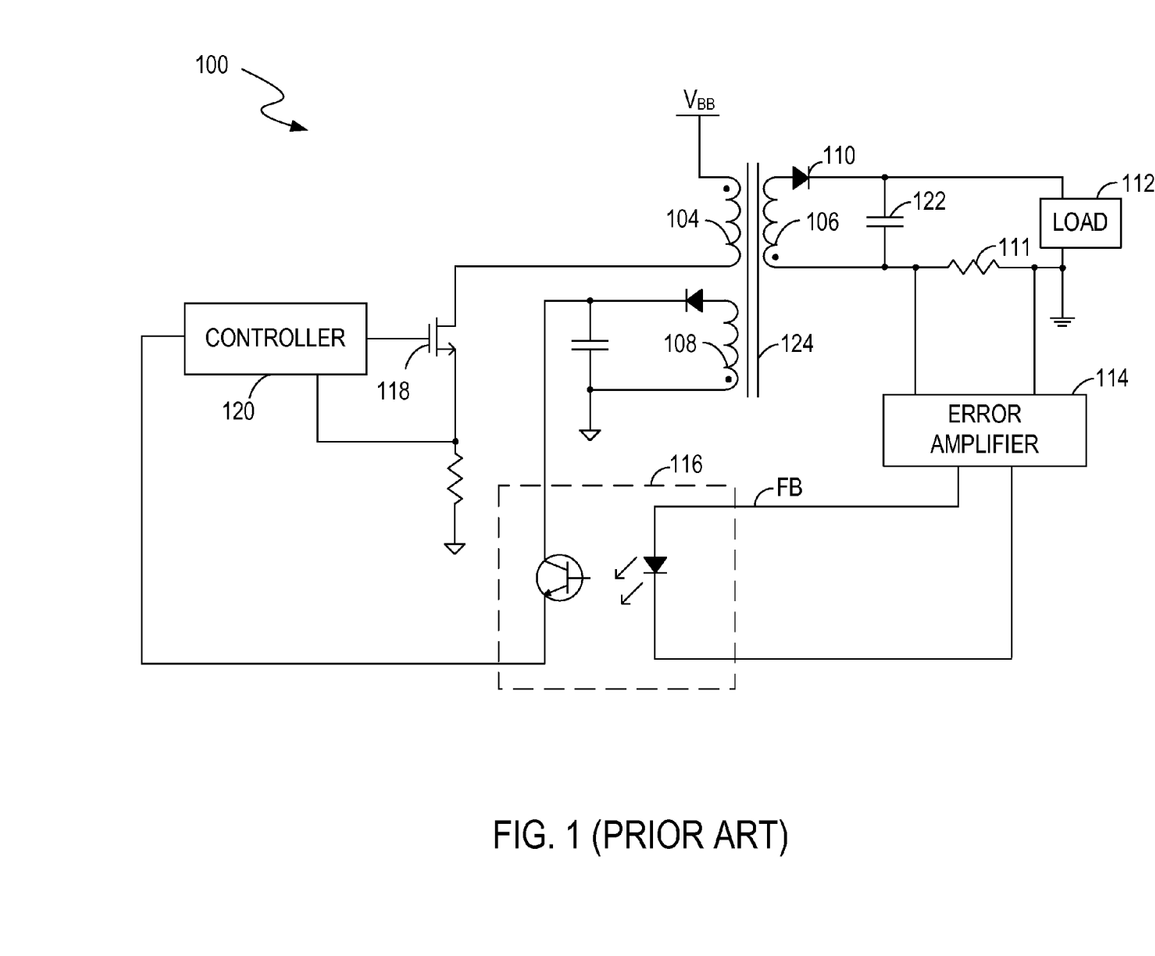
FIG. 1 shows a block diagram of a conventional flyback converter.

A flyback converter is a switch mode power supply circuit that can be used in applications such as AC-to-DC adapters and battery chargers. FIG. 1 shows a block diagram of a conventional flyback converter 100. The flyback converter 100 utilizes a controller 120 to control a transformer. The transformer includes a primary winding 104 coupled to a DC source $V_{BB}$, a secondary winding 106 coupled to a load 112, and an auxiliary winding 108. The controller 120 controls a switch 118 coupled in series with the primary winding 104. When the switch 118 is turned on, a current flows through the primary winding 104 and energy is stored in a magnetic core 124 of the transformer. When the switch 118 is turned off, a diode 110 coupled to the secondary winding 106 is forward biased, and thus the energy stored in the magnetic core 124 is released through the secondary winding 106 to a capacitor 122 and the load 112. An error amplifier 114 compares the current flowing through a current sense resistor 111 with a reference current to generate a feedback signal FB. The feedback signal FB is transferred to the controller 120 through an optical coupler 116. The controller 120 controls the switch 118 based on the feedback signal FB to adjust the output power of the transformer. One of the drawbacks of this conventional flyback converter 100 is that the size of the flyback converter 100 is relatively large.

SUMMARY

In one embodiment, a circuit includes a transformer and a controller. The transformer includes a primary winding and a secondary winding, and operates in multiple switching cycles. A switching cycle includes a charging period and a discharging period. During the charging period, the transformer is powered by the input voltage and a current flowing through the primary winding increases. During the discharging period the transformer discharges to power the load and a current flowing through the secondary winding decreases. The controller includes a pin that receives a first feedback signal indicating the input voltage during the charging period and receives a second feedback signal indicating an electrical condition of the secondary winding during the discharging period. The controller generates a first control signal according to the first feedback signal to regulate the input voltage, and generates a second control signal according to the second feedback signal to regulate an output current flowing through the load.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments in accordance with the present invention provide a driving circuit for driving a load. The driving circuit includes a transformer and a controller. The transformer operates in multiple switching cycles, at least one of which includes a charging period and a discharging period. During the charging period, the transformer is powered by an input voltage and a current through a primary winding of the transformer increases. During the discharging period, the transformer is discharged to power the load, and a current flowing through a secondary winding of the transformer decreases. Advantageously, the controller includes a pin coupled to an auxiliary winding of the transformer. The pin of the controller receives a first feedback signal indicating the input voltage during the charging period and receives a second feedback signal indicating an electrical condition of the secondary winding during the discharging period. Accordingly, the controller regulates the input voltage and regulates a current flowing through the load. Since the single pin receives different feedback signals during different time periods, the pin number of the controller is saved and the cost of the driving circuit is reduced.

Figure 2:
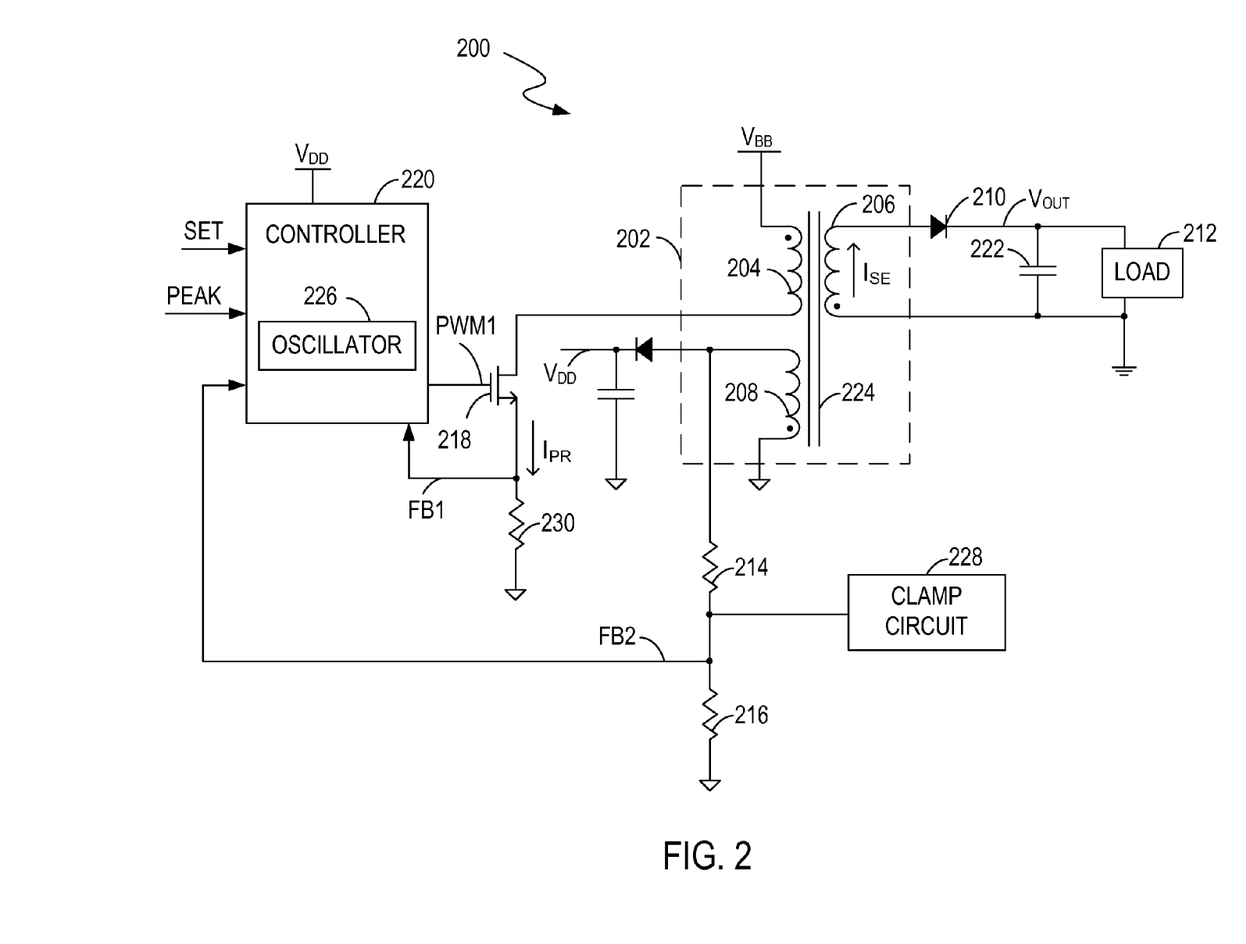
FIG. 2 shows a block diagram of a power converter, in accordance with one embodiment of the present invention.
Figure 4:
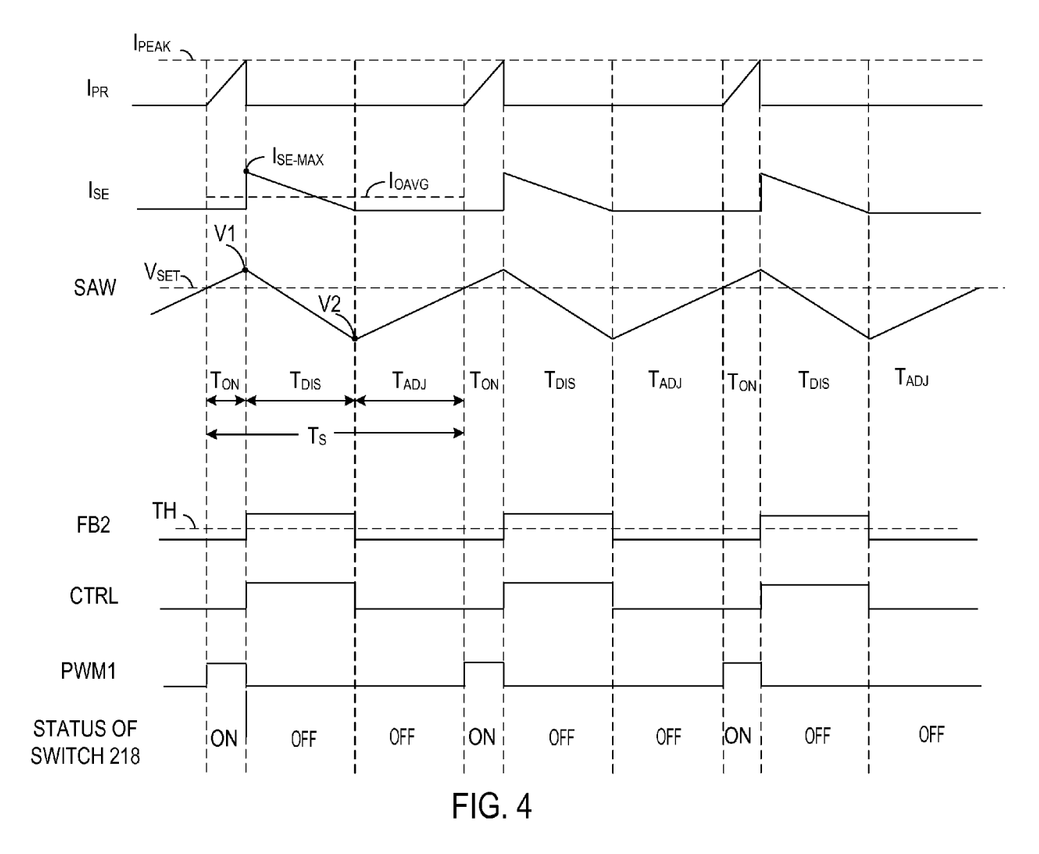
FIG. 4 shows signal waveforms of signals received or generated by a power converter, in accordance with one embodiment of the present invention.

FIG. 2 shows a block diagram of a power converter 200, in accordance with one embodiment of the present invention. FIG. 4 shows signal waveforms of signals received or generated by the power converter 200, in accordance with one embodiment of the present invention. FIG. 2 is described in combination with FIG. 4.

In the example of FIG. 2, the power converter 200 includes a controller 220 to control an operation of a transformer 202. In one embodiment, the transformer 202 includes a primary winding 204, a secondary winding 206, and an auxiliary winding 208. The primary winding 204 has one end coupled to a DC input voltage $V_{BB}$, and the other end coupled to ground through a switch 218 and a resistor 230. The secondary winding 206 is coupled to a load 212 through a diode 210. In one embodiment, the auxiliary winding 208 is at the primary side of the transformer 202. The auxiliary winding 208 has one end coupled to ground through a resistor 214 and a resistor 216, and the other end coupled to ground.

The controller 220 can control the transformer 202 by controlling the switch 218 coupled in series with the primary winding 204. In one embodiment, the controller 220 can be powered by a voltage $V_{DD}$ which is provided by the auxiliary winding 208. The resistor 230 can provide a feedback signal FB1 indicative of a current $I_{PR}$ flowing through the primary winding 204. The auxiliary winding 208 can provide a feedback signal FB2 indicative of an output voltage of the auxiliary winding 208, which can further indicate an output voltage of the secondary winding 206. As such, the feedback signal FB2 can indicate whether a current $I_{SE}$ flowing through the secondary winding 206 decreases to a predetermined current level, e.g., zero. In one embodiment, the feedback signal FB2 can be generated at a node between the resistor 214 and the resistor 216.

The power converter 200 can further include a signal generator 226 (e.g., an oscillator 226) and a clamp circuit 228. The clamp circuit 228 is operable for clamping a voltage of the feedback signal FB2 when the switch 218 is turned on. In one embodiment, the controller 220 receives a reference signal PEAK which can determine a peak current level $I_{PEAK}$ of the current $I_{PR}$ flowing through the primary winding 204, and receives a reference signal SET having a reference voltage level $V_{SET}$. In another embodiment, the reference signal PEAK and the reference signal SET are generated locally by the controller 220.

In operation, the controller 220 can receive the feedback signal FB1 and the feedback signal FB2, and generate a pulse signal, e.g., a pulse width modulation signal PWM1 based on the feedback signal FB1 and the feedback signal FB2 to control the switch 218. By controlling the switch 218 in series with the primary winding 204, the transformer 202 can operate in multiple switching cycles. In one embodiment, a switching cycle includes a charging period $T_{ON}$, a discharging period $T_{DIS}$, and an adjusting period $T_{ADJ}$, as shown in the example of FIG. 4. During the charging period $T_{ON}$, the transformer 202 is powered by the input voltage $V_{BB}$ and the current $I_{PR}$ flowing through the primary winding 204 increases. During the discharging period $T_{DIS}$, the transformer 202 discharges to power the load 212 and the current $I_{SE}$ flowing through the secondary winding 206 decreases.

More specifically, during the charging period $T_{ON}$, the controller 220 can turn on the switch 218 so that the transformer 202 is powered by the input voltage $V_{BB}$. When the switch 218 is on, the diode 210 coupled to the secondary winding 206 is reverse-biased such that there is no current flowing through the secondary winding 206. The current $I_{PR}$ flows through the primary winding 204, the switch 218, and the resistor 230 to ground. The current $I_{PR}$ can be increased linearly. Thus, during the charging period $T_{ON}$, energy can be stored in a magnetic core 224 of the transformer 202. The clamp circuit 228 is operable for clamping a voltage of the feedback signal FB2 during the charging period $T_{ON}$, and thus the voltage of the feedback signal FB2 is substantially zero.

During the discharging period $T_{DIS}$, the controller 220 turns off the switch 218 and the transformer 202 is discharged to power the load 212. When the switch 218 is off, the diode 210 coupled to the secondary winding 206 is forward-biased, and thus the energy stored in the magnetic core 224 is released through the secondary winding 206 to a capacitor 222 and the load 212. The current $I_{SE}$ flowing through the secondary winding 206 can be decreased linearly from a peak current level $I_{SE-MAX}$ to a predetermined current level, e.g., zero, during the discharging period $T_{DB}$. The peak current level $I_{SE-MAX}$ of the secondary winding 206 is determined by the peak current level $I_{PEAK}$ of the primary winding 204 and a coil ratio of the transformer 202.

During the adjusting period $T_{ADJ}$, the switch 218 remains off. In one embodiment, there is no current flowing through the primary winding 204 or the secondary winding 206 during the adjusting period $T_{ADJ}$.

According to the waveform of the current $I_{SE}$ of the secondary winding 206 as shown in FIG. 4, the average output current $I_{OAVG}$ provided by the secondary winding 206 during a switching cycle $T_S$ can be calculated by:

$$I_{OAVG} = \frac{I_{SE-MAX}}{2} \cdot \left(\frac{T_{DIS}}{T_S}\right), \quad (1)$$

where $T_S = T_{ON} + T_{DIS} + T_{ADJ}$.

The duration of the charging period $T_{ON}$ and the duration of the discharging period $T_{DIS}$ can be determined by the inductance of the primary winding 204, the inductance of the secondary winding 206, the input voltage $V_{BB}$, and an output voltage $V_{OUT}$ across the load 212, in one embodiment. The controller 220 can determine a proper duration of the adjusting period $T_{ADJ}$ such that a ratio of the duration of the discharging period $T_{DIS}$ to the duration of the switching cycle $T_S$ is constant, wherein the duration of the switching cycle $T_S$ is the total duration of the charging period $T_{ON}$, the discharging period $T_{DIS}$ and the adjusting period $T_{ADJ}$. In equation (1), the peak current level $I_{SE-MAX}$ of the secondary winding 206 is determined by the peak current level $I_{PEAK}$ of the primary winding 204 and the coil ratio of the transformer 202. In one embodiment, since the peak current level $I_{PEAK}$ of the primary winding 204 can be a predetermined value and the transformer 202 coil ratio is constant, the peak current level $I_{SE-MAX}$ of the secondary winding 206 can be constant. Consequently, according to equation (1), if a ratio of the duration of the discharging period $T_{DIS}$ to the duration of the switching cycle $T_S$ is constant (e.g., $T_S = k^* T_{DIS}$, k is constant), the average output current $I_{OAVG}$ provided by the secondary winding 206 can be substantially constant.

Advantageously, even though the input voltage $V_{BB}$ and the output voltage $V_{OUT}$ may vary, the average output current $I_{OAVG}$ can still be maintained substantially constant if a ratio of the duration of the discharging period $T_{DIS}$ to the duration of the switching cycle $T_S$ is constant. In other words, by using a filter, e.g., a capacitor 222 coupled to the load 212, the power converter 200 can provide a substantially constant output current to the load 212. As used herein, "substantially constant" means that the output current may vary but within a range such that the current ripple caused by non-ideality of the circuit components can be neglected.

Figure 3:
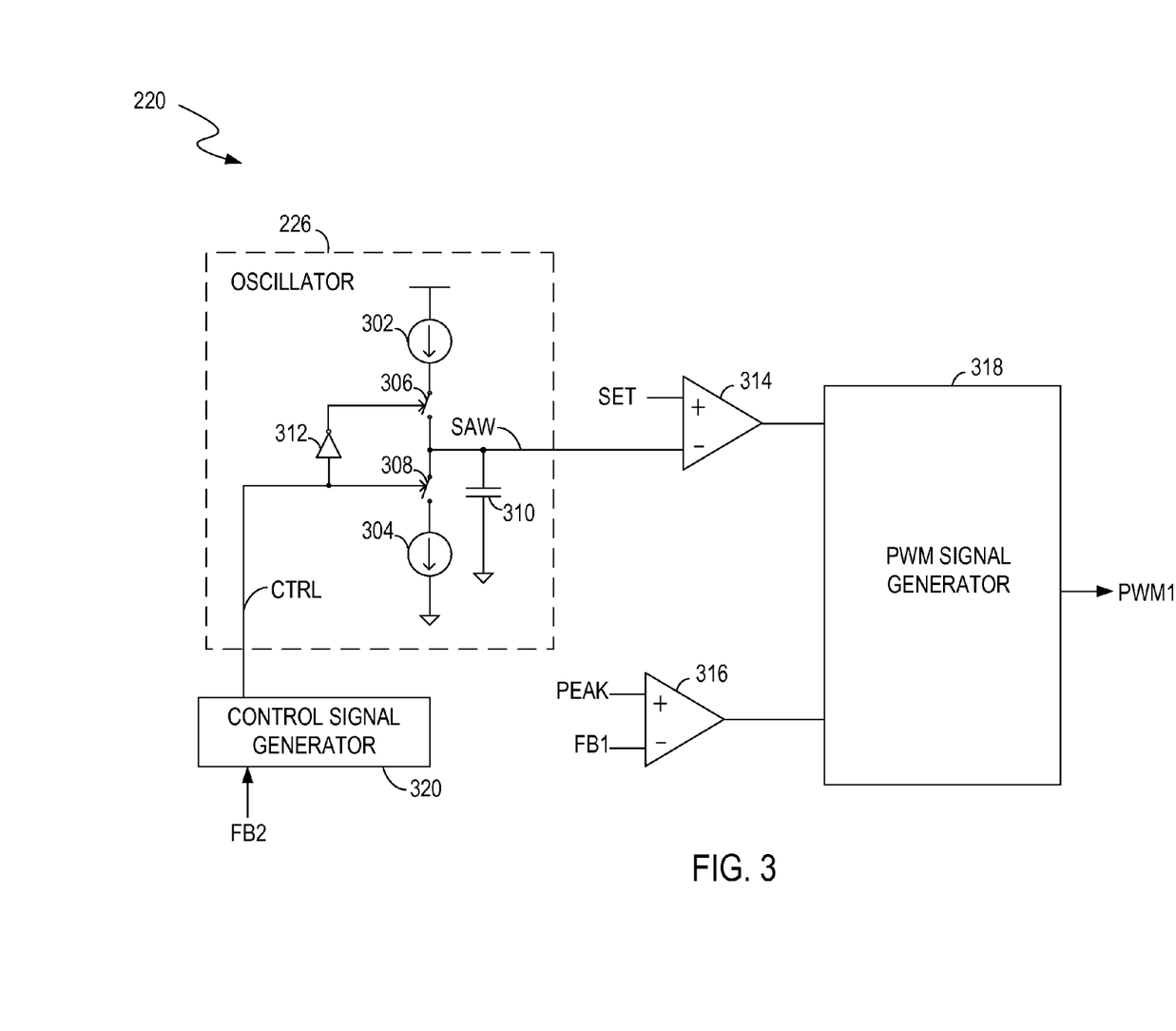
FIG. 3 shows an example of the controller in FIG. 2, in accordance with one embodiment of the present invention.

FIG. 3 shows an example of the controller 220 in FIG. 2, in accordance with one embodiment of the present invention. FIG. 3 is described in combination with FIG. 2 and FIG. 4. The controller 220 can determine a proper duration of the adjusting period $T_{ADJ}$ such that a ratio of the duration of the discharging period $T_{DIS}$ to the duration of the switching cycle $T_S$ is constant. Consequently, the power converter 200 can provide a substantially constant output current to the load 212.

In one embodiment, the controller 220 can include a signal generator 226 (e.g., an oscillator 226), a comparator 314, a comparator 316, and a pulse signal generator 318 (e.g., a PWM signal generator 318). The oscillator 226 is operable for generating a signal, e.g., a sawtooth wave signal SAW based on a feedback signal FB2. The feedback signal FB2 indicates an output voltage of the secondary winding 206. The comparator 314 is operable for comparing the sawtooth wave signal SAW with a reference signal SET. The reference signal SET has a reference voltage level $V_{SET}$. The comparator 316 is operable for comparing the feedback signal FB1 with a reference signal PEAK. The feedback signal FB1 can indicate the current $I_{PR}$ flowing through the primary winding 204. The reference signal PEAK can determine the peak current level $I_{PEAK}$ of the current $I_{PR}$ flowing through the primary winding 204. The PWM signal generator 318 coupled to the comparator 314 and the comparator 316 is operable for generating a pulse signal, e.g., a pulse width modulation signal PWM1. The sawtooth wave signal SAW from the oscillator 226 can be configured to control a duty cycle of the pulse width modulation signal PWM1. The pulse width modulation signal PWM1 is applied to the switch 218 to control a conductance status of the switch 218 and thus to control power of the transformer 202.

The controller 220 can further include a control signal generator 320 to generate a control signal CTRL based on the feedback signal FB2. The control signal CTRL is applied to the oscillator 226. In one embodiment, if the voltage of the feedback signal FB2 is greater than a predetermined threshold TH (e.g., TH>0V), the control signal CTRL is logic 1, otherwise the control signal CTRL is logic 0. In the example of FIG. 3, the oscillator 226 includes current sources 302 and 304, switches 306 and 308, and a capacitor 310. The capacitor 310 generates an output voltage which is the sawtooth wave signal SAW. The capacitor 310 can be charged by a current from the current source 302 or be discharged by a current from the current source 304 depending on the conduction status of the switch 306 and the switch 308.

In operation, if the voltage of the capacitor 310 increases to the reference voltage level $V_{SET}$, the controller 220 can generate a pulse width modulation signal PWM1 having a first level to turn on the switch 218 (e.g., pulse width modulation signal PWM1 is logic 1). Thus, the transformer 202 can operate in the charging period $T_{ON}$. The clamp circuit 228 can force the voltage of the feedback signal FB2 to be substantially zero such that the control signal CTRL has a first level, e.g., logic 0, in one embodiment. The control signal CTRL controls the switch 308 in the oscillator 226. Moreover, the control signal CTRL is coupled to the switch 306 through a NOT gate 312. In the example of FIG. 3, when the control signal CTRL is logic 0, the switch 306 is turned on and the switch 308 is turned off. The capacitor 310 is charged by a current from the current source 302. Thus, the voltage of capacitor 310, e.g., the sawtooth wave signal SAW, can increase from the reference voltage level $V_{SET}$. Meanwhile, the current $I_{PR}$ flowing through the primary winding 204 increases. The comparator 316 compares the feedback signal FB1 with the reference signal PEAK. When the voltage of the feedback signal FB1 reaches the voltage of the reference signal PEAK, which indicates that the current $I_{PR}$ through the primary winding 204 increases to the peak current level $I_{PEAK}$, the controller 220 can turn off the switch 218 to terminate the charging period $T_{ON}$ and to initiate a discharging period $T_{DIS}$. More specifically, the PWM signal generator 318 can generate the pulse width modulation signal PWM1 having a second level (e.g., pulse width modulation signal PWM1 is logic 0) to turn off the switch 218. At the end of the charging period $T_{ON}$, the voltage of the capacitor 310, e.g., the sawtooth wave signal SAW, can increase to a first level $V_1$ as shown in FIG. 4. In other words, the switch 218 is turned on when the sawtooth wave signal SAW (the voltage across the capacitor 310) increases from the reference voltage level $V_{SET}$ until the sawtooth wave signal SAW reaches the first level $V_1$.

During the discharging period $T_{DIS}$, the switch 218 is turned off and the current $I_{SE}$ flowing through the secondary winding 206 decreases from a peak level $I_{SE-MAX}$. The auxiliary winding 208 can generate a substantially constant output voltage during the discharging period $T_{DIS}$. This output voltage is divided by the resistor 214 and the resistor 216. Therefore, during the discharging period $T_{DIS}$, the voltage of the feedback signal FB2 (e.g., the voltage across the resistor 216) is proportional to the output voltage of the auxiliary winding 208, and thus can also be substantially constant. In one embodiment, the resistance of the resistor 214 and the resistance of the resistor 216 are determined in such a way that the voltage of the feedback signal FB2 is greater than the predetermined threshold TH during the discharging period $T_{DIS}$. In the example of FIG. 3, because the feedback signal FB2 has a voltage greater than the threshold TH, the control signal CTRL is logic 1. As a result, the switch 306 is turned off and the switch 308 is turned on. The capacitor 310 is discharged by a current from the current source 304. Accordingly, the voltage of capacitor 310 can decrease from the first level $V_1$.

When the voltage of the feedback signal FB2, which indicates the output voltage of the secondary winding 206, decreases to the threshold TH, i.e., the current $I_{SE}$ flowing through the secondary winding 206 decreases to a predetermined current level, the controller 220 can terminate the discharging period $T_{Dis}$ and initiate an adjusting period $T_{ADJ}$. In one embodiment, the controller 220 terminates the discharging period $T_{Dis}$ and initiates an adjusting period $T_{ADJ}$ when the current $I_{SE}$ flowing through the secondary winding 206 decreases to substantially zero. At the end of the discharging period $T_{DIS}$, the voltage of the capacitor 310, e.g., the sawtooth wave signal SAW can decrease to a second level $V_2$ as shown in FIG. 4.

During the adjusting period $T_{ADJ}$, because the voltage of the feedback signal FB2 decreases to the threshold TH, the control signal CTRL turns to logic 0. The switch 306 is turned on and switch 308 is turned off. The capacitor 310 is charged again by the current from the current source 302. The voltage of capacitor 310 increases from the second level $V_2$. During the adjusting period $T_{ADJ}$, the switch 218 remains off and there is no current flowing through the primary winding 204 or the secondary winding 206. When the sawtooth wave signal SAW increases to the reference voltage level $V_{SET}$, the controller 220 can terminate the adjusting period $T_{ADJ}$ and turns on the switch 218 to initiate a charging period $T_{ON}$ of a next switching cycle. More specifically, the PWM signal generator 318 can generate the pulse width modulation signal PWM1 having the first level (e.g., pulse width modulation signal PWM1 is logic 1) to turn on the switch 218.

Assume that the capacitance of the capacitor 310 is $C_1$, the current of the current source 302 is $I_1$ and the current of the current source 304 is $I_2$. At the end of the charging period $T_{ON}$, the voltage of the sawtooth wave signal SAW (the voltage of the capacitor 310) can be given by:

$$V_1 = V_{SET} + \frac{T_{ON} \cdot I_1}{C_1}. \quad (2)$$

At the end of the discharging period $T_{DIS}$, the voltage of the sawtooth wave signal SAW can be given by:

$$V_2 = V_1 - \frac{T_{DIS} \cdot I_2}{C_1}. \quad (3)$$

At the end of the adjusting period $T_{ADJ}$, the voltage of the sawtooth wave signal SAW can be given by:

$$V_{SET} = V_2 + \frac{T_{ADJ} \cdot I_1}{C_1}. \quad (4)$$

Thus, the duration of the adjusting period $T_{ADJ}$ can be derived from equations (2)-(4), that is:

$$T_{ADJ} = \frac{(V_{SET} - V_2) \cdot C_1}{I_1} = T_{DIS} \cdot \frac{I_2}{I_1} - T_{ON}. \quad (5)$$

According to equation (5), the relationship between the duration of the discharging period $T_{Dis}$ and the duration of the switching cycle $T_S$ can be expressed by:

$$\frac{T_{DIS}}{T_S} = \frac{T_{DIS}}{T_{ON} + T_{DIS} + T_{ADJ}} = \frac{I_1}{I_1 + I_2}. \quad (6)$$

Thus, the ratio of the duration of the discharging period $T_{Dis}$ to a total duration of the charging period $T_{ON}$, the discharging period $T_{Dis}$ and the adjusting period $T_{ADJ}$ is determined by the current $I_1$ and the current $I_2$. Advantageously, the duration of the discharging period $T_{DIS}$ can be proportional to the duration of the switching cycle $T_S$ if the current $I_1$ from the current source 302 and the current $I_2$ from the current source 304 are constant. Therefore, referring back to equation (1), the average output current $I_{OAVG}$ provided by the secondary winding 206 can be substantially constant.

Figure 5:
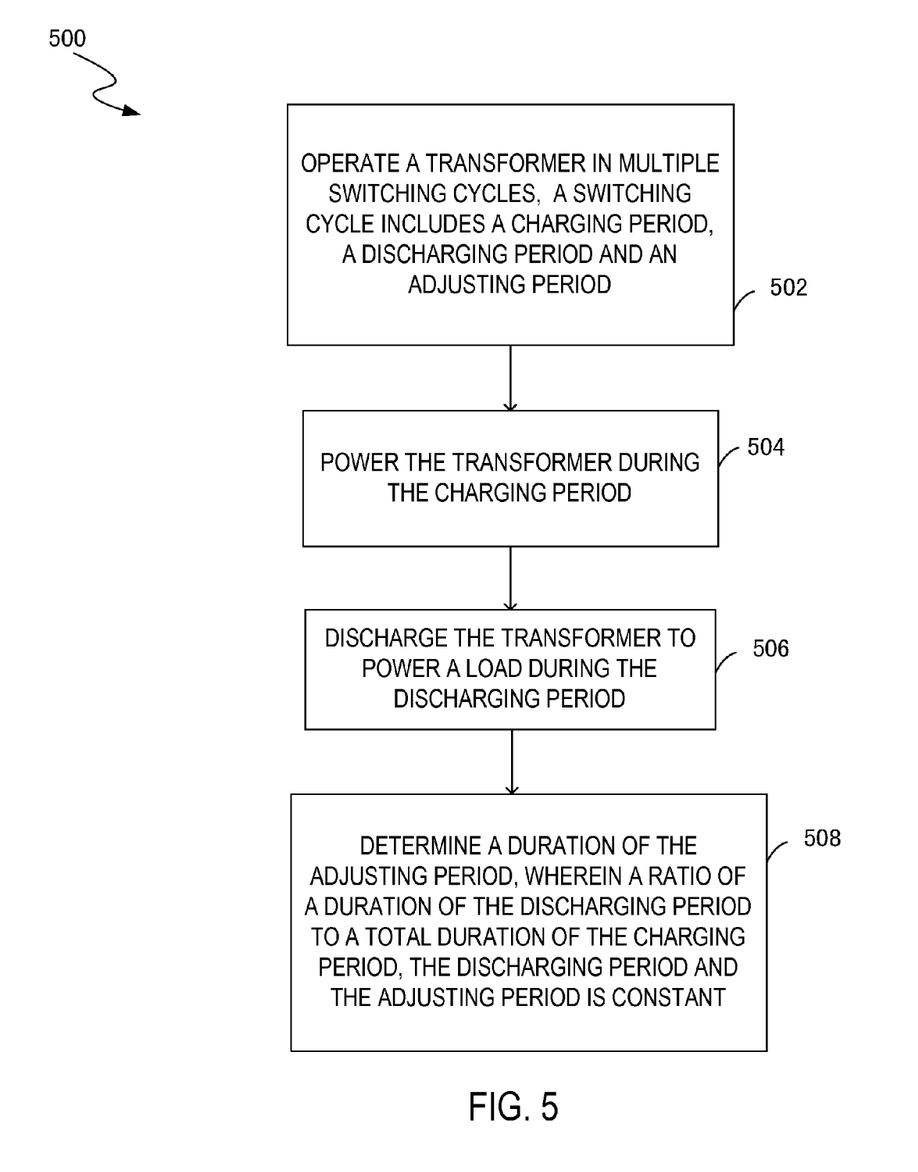
FIG. 5 shows a flowchart of a method for controlling a transformer, in accordance with one embodiment of the present invention.

FIG. 5 shows a flowchart 500 of a method for controlling a transformer, in accordance with one embodiment of the present invention. FIG. 5 is described in combination with FIG. 2, FIG. 3 and FIG. 4.

In block 502, a transformer 202 is operated in multiple switching cycles. A switching cycle can include a charging period $T_{ON}$, a discharging period $T_{DIS}$, and an adjusting period $T_{ADJ}$.

In block 504, the transformer 202 is powered by an input power during the charging period $T_{ON}$. During the charging period $T_{ON}$, a switch 218 coupled in series with a primary winding 204 of the transformer 202 is switched on. In one embodiment, the charging period $T_{ON}$ can be controlled by monitoring a current flowing through a primary winding 204 of the transformer 202. More specifically, the charging period $T_{ON}$ can be terminated (the switch 218 is turned off at the end of the charging period $T_{ON}$) and a discharging period $T_{Dis}$ can be initiated when the current flowing through the primary winding 204 increases to a predetermined peak current level.

In block 506, the transformer 202 is discharged to power a load during the discharging period $T_{DIS}$. In one embodiment, the discharging period $T_{DIS}$ can be controlled by monitoring an output voltage of an auxiliary winding 208 of the transformer 202. The output voltage of an auxiliary winding 208 can indicate whether a current flowing through the secondary winding 206 of the transformer 202 decreases to a predetermined current level. More specifically, the discharging period $T_{DIS}$ can be terminated and an adjusting period $T_{ADJ}$ can be initiated when the current flowing through the secondary winding 206 decreases to the predetermined current level, e.g., zero. In one embodiment, the current flowing through the secondary winding 206 decreases to the predetermined current level if the output voltage of the auxiliary winding 208 decreases to a predetermined voltage.

In block 508, a duration of the adjusting period $T_{ADJ}$ is determined such that a ratio of a duration of the discharging period $T_{DIS}$ to a total duration of the charging period $T_{ON}$, the discharging period $T_{DIS}$ and the adjusting period $T_{ADJ}$ is constant. In one embodiment, the duration of the adjusting period $T_{ADJ}$ can be determined by an oscillator 226. The oscillator 226 is operable for generating a sawtooth wave signal SAW. During the charging period $T_{oN}$, the sawtooth wave signal increases from a predetermined reference voltage level $V_{SET}$ to a first level $V_1$. During the discharging period $T_{DIS}$, the sawtooth wave signal decreases from the first level $V_1$ to a second level $V_2$. During the adjusting period $T_{ADJ}$ the sawtooth wave signal SAW increases from the second level $V_2$ to the reference voltage level $V_{SET}$. The adjusting period $T_{ADJ}$ can be terminated when the sawtooth wave signal SAW increases to the reference voltage level $V_{SET}$ and a new switching cycle $T_S$ can begin.

Accordingly, embodiments in accordance with the present invention provide circuits and methods for controlling power converters that can be used to power various types of loads. The power converter includes a transformer operated in multiple switching cycles. At least one switching cycle includes a charging period $T_{ON}$, a discharging period $T_{DIS}$ and an adjusting period $T_{ADJ}$. The power converter can determine a proper duration of the adjusting period $T_{ADJ}$, such that a ratio of the duration of the discharging period $T_{DIS}$ to the duration of the switching cycle $T_S$ is constant. The duration of the switching cycle $T_S$ is the total duration of the charging period $T_{ON}$, the discharging period $T_{DIS}$ and the adjusting period $T_{ADJ}$. Therefore, an average output current of each switching cycle can be substantially constant.

The power converter according to the present invention can be used in various applications. In one embodiment, the power converter can provide a substantially constant current to power a light source such as a light emitting diode (LED) string. In another embodiment, the power converter can provide a substantially constant current to charge a battery.

Advantageously, compared with the conventional flyback converter which includes an optical coupler and an error amplifier, the size of the power converter according to the present invention is relatively small.

Moreover, even if the duration of the charging period $T_{ON}$ and the duration of the discharging period $T_{DIS}$ may vary with the change of the input voltage and the output voltage of the power converter, the power converter according to the present invention can automatically adjust the duration of the adjusting period $T_{ADJ}$ to maintain a ratio of the duration of the discharging period $T_{DIS}$ to a duration of the switching cycle $T_S$ to be constant. As a result, the power converter can be self-adjusted to provide a substantially constant average output current. In addition, as can be seen in equation (1), the average output current of the power converter is not affected by the inductance of the transformer windings. Therefore, the output current of the power converter can be controlled more accurately.

Figure 6:
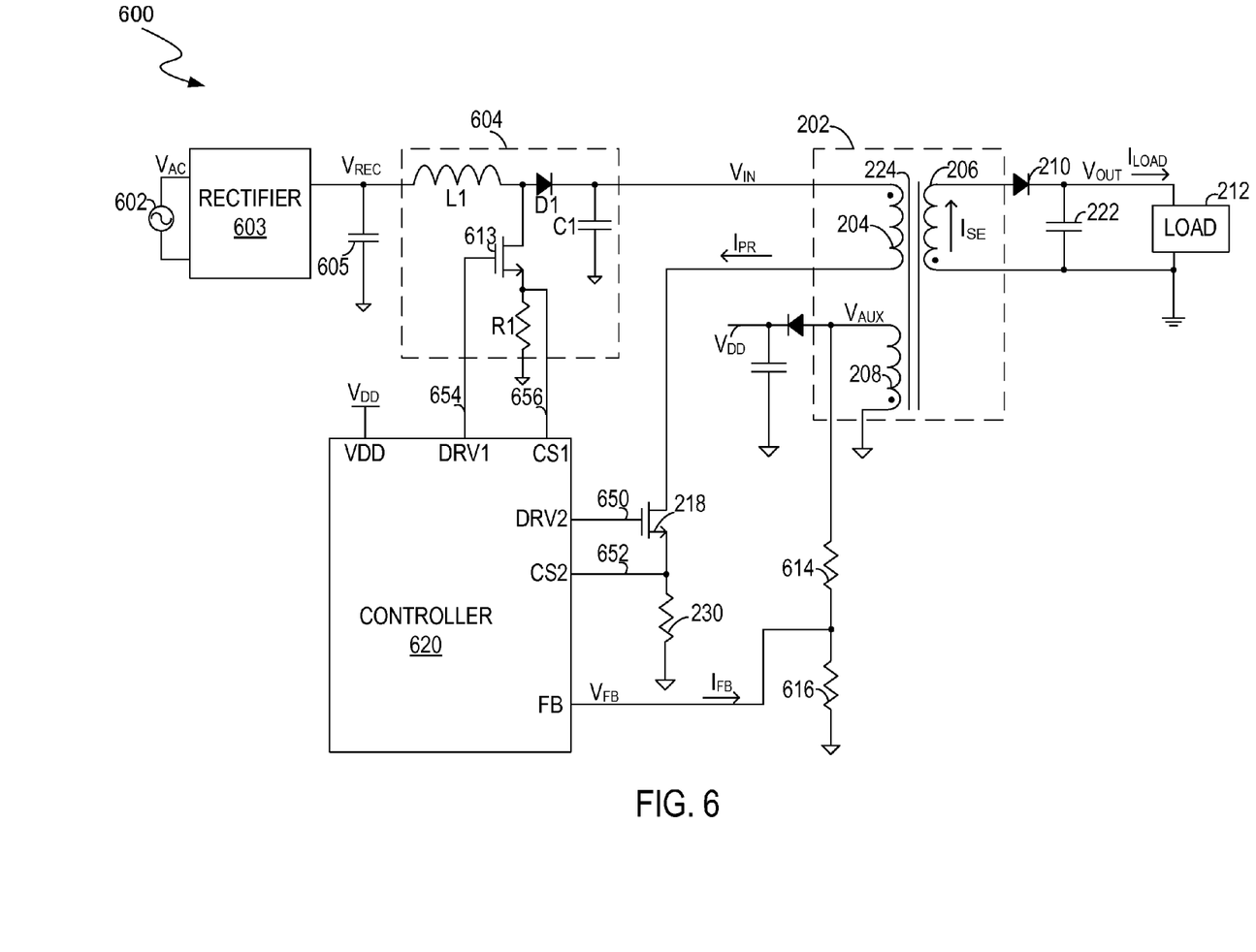
FIG. 6 illustrates a diagram of a driving circuit for driving a load, in accordance with one embodiment of the present invention.

FIG. 6 illustrates a diagram of a driving circuit 600 for driving a load 212, in accordance with one embodiment of the present invention. Elements labeled the same as in FIG. 2 have similar functions. In the example of FIG. 6, the driving circuit 600 is coupled to a power source 602 that generates an alternating current (AC) input voltage $V_{AC}$, e.g., having a sinusoidal waveform. The driving circuit 600 operates as a power converter to receive the AC input voltage $V_{AC}$ and provide an output voltage $V_{OUT}$ to power the load 212. The load 212 can be, but is not limited to, a light source, e.g., a light-emitting diode (LED) light source.

In one embodiment, the driving circuit 600 includes a rectifier 603, a converter 604, a transformer 202, and a controller 620. In one embodiment, the controller 620 includes pins such as a VDD pin, a DRV1 pin, a CS1 pin, a DRV2 pin, a CS2 pin, and a FB pin. The rectifier 603 commutates the AC input voltage $V_{AC}$ to provide a rectified AC voltage $V_{REC}$, e.g., having a rectified sinusoidal waveform. A capacitor 605 operates as a filter to smooth the rectified AC voltage $V_{REC}$. The converter 604 coupled between the rectifier 603 and the transformer 202 converts the rectified AC voltage $V_{REC}$ to an input voltage $V_{IN}$. In the example of FIG. 6, the converter 604 is a boost converter including an inductor L1, a diode D1, a capacitor C1, a resistor R1, and a switch 613. The invention is not so limited; the converter can be other types of converters such as a buck converter or a buck-boost converter. The resistor R1 provides a monitoring signal 656 indicating a current flowing through the inductor L1, which is received by the controller 620 via the pin CS1. The transformer 202 is powered by the input voltage $V_{IN}$ and generates the output voltage $V_{OUT}$ to power the load 212. A capacitor 222 coupled to the load 212 filters ripples of a current $I_{LOAD}$ flowing through the load 212. The controller 620 generates a switch control signal 654 via the DRV1 pin to regulate the input voltage $V_{IN}$ and generates a switch control signal 650 via the DRV2 pin to regulate the current $I_{LOAD}$ through the load 212.

In one embodiment, the transformer 202 includes a primary winding 204, a secondary winding 206, an auxiliary winding 208, and a core 224. The primary winding 204 has one end coupled to the converter 604 and the other end coupled to ground through a switch 218 and a resistor 230. The secondary winding 206 is coupled to the load 212 through a diode 210 and the capacitor 222. In one embodiment, the auxiliary winding 208 has one end coupled to ground through a pair of resistors 614 and 616, and the other end coupled to ground. The FB pin of the controller 620 is coupled to a common node of the resistors 614 and 616.

Figure 7:
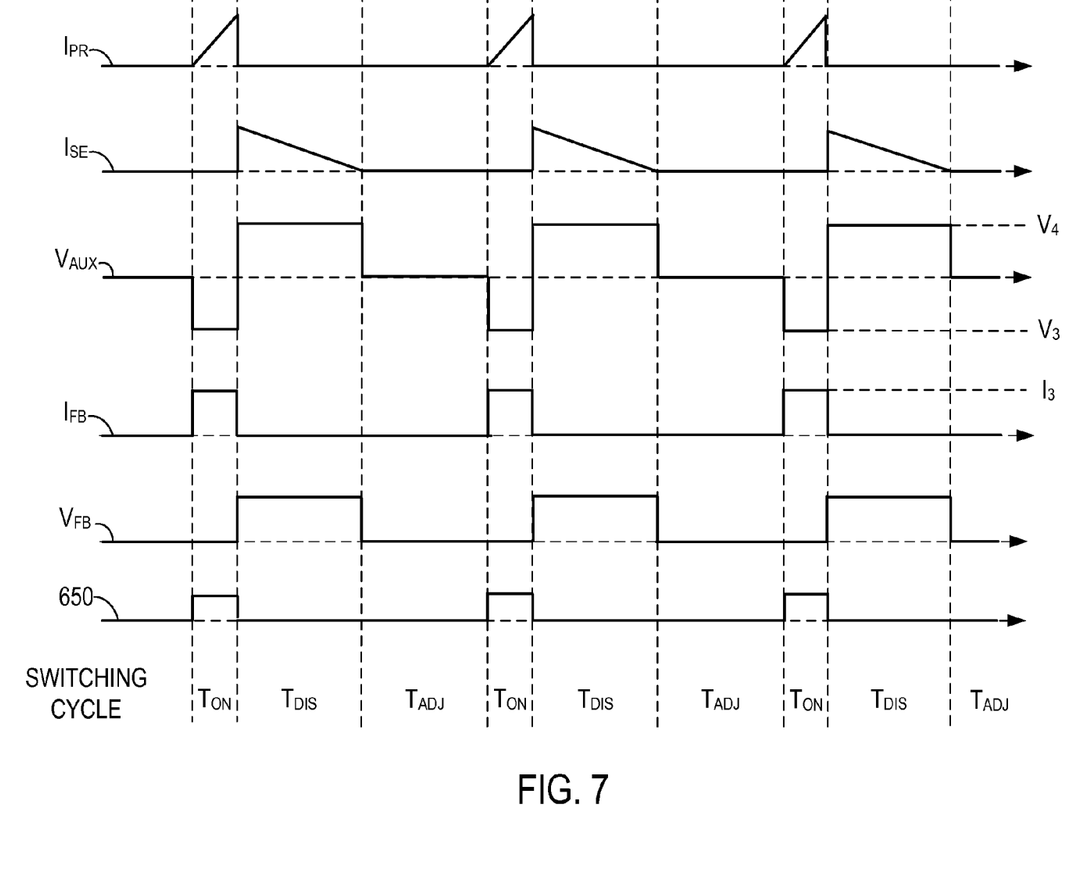
FIG. 7 shows waveforms of signals received or generated by a driving circuit, in accordance with one embodiment with the present invention.

FIG. 7 illustrates an example for waveforms of signals received or generated by the driving circuit 600, in accordance with one embodiment with the present invention. FIG. 7 is described in combination with FIG. 6. FIG. 7 shows a current $I_{PR}$ flowing through the primary winding 204, a current $I_{BE}$ flowing through the secondary winding 206, a voltage $V_{AUX}$ at the non-polarity end of the auxiliary winding 208, a current $I_{FB}$ flowing through the FB pin of the controller 620, a voltage $V_{FB}$ at the FB pin, and the switch control signal 650.

In one embodiment, the controller 620 generates the switch control signal 650 to turn the switch 218 on and off, which further enables the transformer 202 to operate in multiple switching cycles. In one embodiment, a switching cycle consists of a charging period $T_{ON}$ and a discharging period $T_{DIS}$. Alternatively, as shown in the embodiment of FIG. 7, the switching cycle includes a charging period $T_{ON}$, a discharging period $T_{DIS}$, and an adjusting period $T_{ADS}$. In both circumstances, the switch control signal 650 turns on the switch 218 during the charging period $T_{ON}$ and turns off the switch 218 during the discharging period $T_{DIS}$. As such, during the charging period $T_{ON}$, the transformer 202 is powered by the input voltage $V_{IN}$, and a current $I_{PR}$ flowing through the primary winding 204 increases. In one embodiment, the resistor 230 generates a monitoring signal 652 indicating the current $I_{PR}$ during the charging period $T_{ON}$. The monitoring signal 652 is received by the controller 620 through the CS2 pin. During the discharging period $T_{DIS}$, the transformer 202 is discharged to power the load 212, and the current $I_{BE}$ through the secondary winding 206 decreases.

During the charging period $T_{ON}$ and the discharging period $T_{DIS}$, the transformer 202 is capable of providing different feedback signals to the single pin FB of the controller 620. More specifically, in one embodiment, during the charging period $T_{ON}$, the voltage $V_{AUX}$ has a level $V_3$ proportional to the voltage $V_{IN}$ at the primary winding 204, which can be given by:

$$V_{AUX}=V_3=-V_{IN}*(N_A/N_P), \qquad (7)$$

where $N_A$ represents the turn number of the auxiliary winding 208, and $N_P$ represents the turn number of the primary winding 204. As shown in equation (7), $V_{AUX}$ has a negative voltage level during the charging period $T_{ON}$. In one embodiment, the controller 620 clamps the voltage $V_{FB}$ on the FB pin at a predetermined voltage level (such as zero volts), e.g., to prevent the voltage $V_{FB}$ from dropping below zero volts. As such, during the charging period $T_{ON}$, the voltage $V_{FB}$ is equal to zero volts, in one embodiment. Therefore, the current $I_{FB}$ flows from the FB pin through the resistor 614 to the auxiliary winding 208. The current $I_{FB}$ has a current level $I_3$, which is given according to equation (8):

$$I_{FB}=I_3=V_{IN}*(N_A/N_P)/R_{614}, \qquad (8)$$

where $R_{614}$ represents the resistance of the resistor 614. Since $(N_A/N_P)/R_{614}$ is substantially constant, the level $I_3$ of the current $I_{FB}$ is proportional to the level of the voltage $V_{IN}$.

During the discharging period $T_{DIS}$, the auxiliary winding 208 senses the electrical condition of the secondary winding 206. More specifically, in one embodiment, when the current $I_{SE}$ through the secondary winding 206 decreases, the voltage $V_{AUX}$ at the auxiliary winding 208 has a positive level $V_4$, e.g., $V_4=V_{OUT}*(N_A/N_S)$, where $N_S$ represents the turn number of the secondary winding 206. When the current $I_{SE}$ decreases to a predetermined current level such as zero ampere, a negative-going edge occurs to the voltage $V_{AUX}$. The resistors 614 and 616 divide the voltage $V_{AUX}$ to provide the voltage $V_{FB}$ which is proportional to the voltage $V_{AUX}$. As such, the voltage $V_{FB}$ at the FB pin indicates whether the current $I_{SE}$ through the secondary winding 206 decreases to the predetermined current level during the discharging period $T_{DIS}$.

Therefore, the current $I_{FB}$ through the FB pin is proportional to the input voltage $V_{IN}$ during the charging period $T_{ON}$. The voltage $V_{FB}$ at the FB pin indicates whether the current $I_{SE}$ decreases to the predetermined current level during the discharging period $T_{DIS}$. Advantageously, through the same pin FB, the controller 620 receives a first feedback signal $I_{FB}$ indicative of the input voltage $V_{IN}$ and receives a second feedback signal $V_{FB}$ indicative of the electrical condition of the secondary winding 206. Therefore, the pin number of the controller 620 is reduced, which further reduces the size and the cost of the driving circuit 600.

In one embodiment, the controller 620 controls the switch control signal 654 at the DRV1 pin according to the first feedback signal to regulate the voltage $V_{IN}$, e.g., to adjust the voltage $V_{IN}$ to a target voltage level. Furthermore, the controller 620 controls the switch control signal 650 at the DRV2 pin according to the second feedback signal to regulate the current $I_{LOAD}$, e.g., to maintain the current $I_{LOAD}$ at a substantially constant current level. The operation of the controller 620 is further described in relation to FIG. 8.

In one embodiment, the capacitor 605 has a relatively small capacitance, e.g., less than 0.5 μF, to help eliminate or reduce any distortion of the waveform of the rectified AC voltage $V_{REC}$ (e.g., in order to correct a power factor of the driving circuit 600). By including the converter 604 coupled between the rectifier 603 and the transformer 202, the input voltage $V_{IN}$ can have a substantially constant voltage level. Thus, the ripples of the current $I_{LOAD}$ are reduced due to the relatively stable voltage $V_{IN}$.

Figure 8:
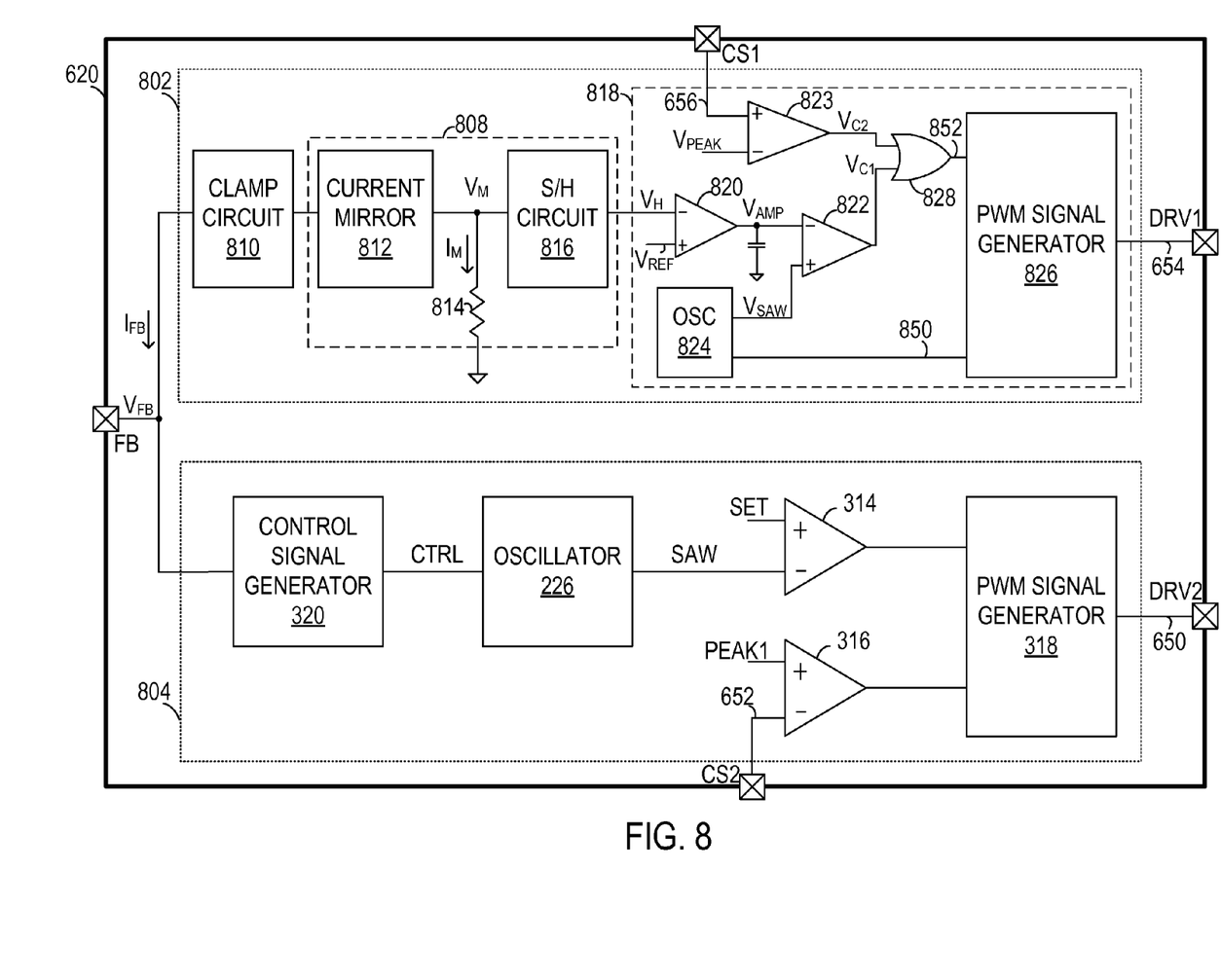
FIG. 8 illustrates an example of a diagram of a controller, in accordance with one embodiment of the present invention.

FIG. 8 illustrates an example of a diagram of the controller 620, in accordance with one embodiment of the present invention. Elements labeled the same as in FIG. 2, FIG. 3, and FIG. 6 have similar functions. FIG. 8 is described in combination to FIG. 3, FIG. 4, FIG. 6 and FIG. 7. In the example of FIG. 8, the controller 620 includes a voltage control unit 802 and a current control unit 804. The voltage control unit 802 monitors the current $I_{FB}$ through the FB pin, and generates the switch control signal 654 at the DRV1 pin to regulate the input voltage $V_{IN}$. The current control unit 804 monitors the voltage $V_{FB}$ at the FB pin, and generates the switch control signal 650 at the DRV2 pin to regulate the output current $I_{OUT}$.

In one embodiment, the current control unit 804 has similar configurations to the controller 220 in FIG. 3. The current control unit 804 includes a control signal generator 320, an oscillator 226, a comparator 314, a comparator 316, and a PWM signal generator 318. The control signal generator 320 generates a control signal CTRL based on the second feedback signal $V_{FB}$. The oscillator 226 receives the control signal CTRL, and generates a saw-tooth wave signal SAW accordingly. The comparator 314 compares the saw-tooth wave signal SAW with a reference signal SET. The comparator 316 compares the monitoring signal 652 indicating the current $I_{PR}$ during the charging period $T_{ON}$ with a reference signal PEAK1. The PWM signal generator 318 coupled to the comparators 314 and 316 is operable for generating the switch control signal 650, e.g., a PWM signal, to control the switch 218.

Similar to the operation of the controller 220, the saw-tooth wave signal SAW controls the duty cycle of the PWM signal 650. More specifically, as discussed in relation to FIG. 3 and FIG. 4, during the charging period $T_{ON}$, the saw-tooth wave signal SAW increases from a level $V_{SET}$ of the reference signal SET, and the current $I_{PR}$ flowing through the primary winding 204 increases. When the voltage of the monitoring signal 652 indicating the current $I_{PR}$ reaches the peak level PEAK1, e.g., when the signal SAW reaches the level V1, the switch control signal 650 turns off the switch 218 to terminate the charging period $T_{ON}$ and to begin a discharging period $T_{DIS}$. During the discharging period $T_{DIS}$, the current $I_{SE}$ through the secondary winding 206 decreases, and the saw-tooth wave signal SAW decreases from the level V1. When the current $I_{SE}$ decreases to a predetermined current level such as zero ampere, e.g., when a negative-going edge occurs to the voltage $V_{FB}$, the signal SAW decreases to the level V2. Thus, the current control unit 804 terminates the discharging period $T_{DIS}$ and begins an adjusting period $T_{ADJ}$. During the adjusting period $T_{ADJ}$, the signal SAW rises from the level V2. When the signal SAW rises to the level $V_{SET}$, the current control unit 804 turns on the switch 218 to start a new switching cycle.

Advantageously, based on equation (6), the current control unit 804 maintains the ratio of the duration of the discharging period $T_{DIS}$ to a total duration of the charging period $T_{ON}$, the discharging period $T_{DIS}$, and the adjusting period $T_{ADJ}$ to be substantially constant, such that the current $I_{LOAD}$ through the load 212 is substantially constant. The current control unit 804 can have other configurations, and is not limited to the example shown in FIG. 8.

In one embodiment, the voltage control unit 802 includes a clamp circuit 810, a current detector 808, and a voltage regulator 818. As described in relation to FIG. 6, the voltage $V_{AUX}$ of the auxiliary winding 208 has a negative level when the switch 218 is turned on. The clamp circuit 810 coupled to the FB pin detects the voltage $V_{FB}$ at the FB pin and clamps the voltage $V_{FB}$ at a predetermined voltage level such as zero volts during the charging period $T_{ON}$ to prevent the voltage $V_{FB}$ from dropping below zero volts, in one embodiment. Thus, the current $I_{FB}$ flows from the current detector 808 through the clamp circuit 810 to the FB pin.

In one embodiment, the current detector 808 includes a current mirror 812, a resistor 814, and a sample/hold (S/H) circuit 816. The current mirror 812 mirrors the current $I_{FB}$ to generate a current $I_M$ that is equal to or proportional to the current $I_{FB}$. The current $I_M$ flows through the resistor 814, and thus a voltage $V_M$ across the resistor 814 is also proportional to the current $I_{FB}$. According to equation (8), the current $I_{FB}$ is proportional to the voltage $V_{IN}$ during the charging period $T_{ON}$. Thus, the voltage $V_M$ is proportional to the voltage $V_{IN}$. The sample/hold circuit 816 samples the voltage $V_M$ during the charging period $T_{ON}$ and holds the voltage $V_M$ that is sampled during the charging period $T_{ON}$ to generate a voltage $V_H$. Thus, during the discharging period $T_{DIS}$ and the adjusting period $T_{ADS}$, the voltage $V_H$ still indicates the input voltage $V_{IN}$, although the current $I_{FB}$ drops to zero ampere.

By way of example, the voltage regulator 818 includes an error amplifier 820, a comparator 822, a comparator 823, an OR gate 828, an oscillator (OSC) 824, and a PWM signal generator 826. The oscillator 824 is operable for generating a saw-tooth signal $V_{SAW}$ and a clock signal 850, e.g., a pulse signal. The error amplifier 820 has one input for receiving a reference signal $V_{REF}$ indicating a target voltage level for the voltage $V_{IN}$ and the other input for receiving the voltage $V_H$. The error amplifier 820 amplifies a difference between the voltage $V_H$ and the reference signal $V_{REF}$ to generate an amplifying voltage $V_{AMP}$. The comparator 822 compares the saw-tooth signal $V_{SAW}$ with the amplifying voltage $V_{AMP}$ to generate a comparing voltage $V_C1$. The comparator 823 compares the monitoring signal 656 indicating a current level of current $I_{IND}$ through the inductor L1 with a reference signal $V_{PEAK}$ indicating a peak level of the current $I_{IND}$ to generate a comparing voltage $V_{C2}$. The OR gate 852 receives the comparing voltage $V_C1$ and the comparing voltage $V_C2$, and generates a control signal 852 accordingly.

The PWM signal generator 826 generates the switch control signal 654 based on the clock signal 850 and the control signal 852 to control the switch 613 so as to regulate the voltage $V_{IN}$. In one embodiment, the PWM signal generator 826 turns on the switch 613 according to the clock signal 850 and turns off the switch 613 according to the control signal 852. More specifically, in one embodiment, the clock signal 850 is a pulse signal having a substantially constant frequency. Thus, the cycle period for the on state and the off state of the switch 613 is substantially constant. In addition, the holding voltage $V_H$ indicating the input voltage $V_{IN}$ determines the time period for the ON state of the switch 613. Thus, the duty cycle of switch control signal 654 is determined by the holding voltage $V_H$. For example, if the input voltage $V_H$ is greater than the reference voltage $V_{REF}$, indicating that $V_{IN}$ is greater than a target voltage level, e.g., indicated by the reference signal $V_{REF}$, the duty cycle of switch control signal 654 is decreased to decrease the voltage $V_{IN}$. Likewise, if the input voltage $V_H$ is less than the reference voltage $V_{REF}$, indicating that $V_{IN}$ is less than the target voltage level, the duty cycle of switch control signal 654 is increased to increase the voltage $V_{IN}$. Therefore, the voltage $V_{IN}$ can be adjusted to the target voltage level.

In one embodiment, the current $I_{IND}$ flowing through the inductor L1 of the converter 604 is protected from an overcurrent condition. For example, if the monitoring signal 656 is greater than the reference voltage $V_{PEAK}$, indicating that the current $I_{IND}$ is greater than a peak current level, the switch control signal 654 turns off the switch 613. The voltage control unit 802 can have other configurations and is not limited to the example shown in FIG. 8.

Figure 9:
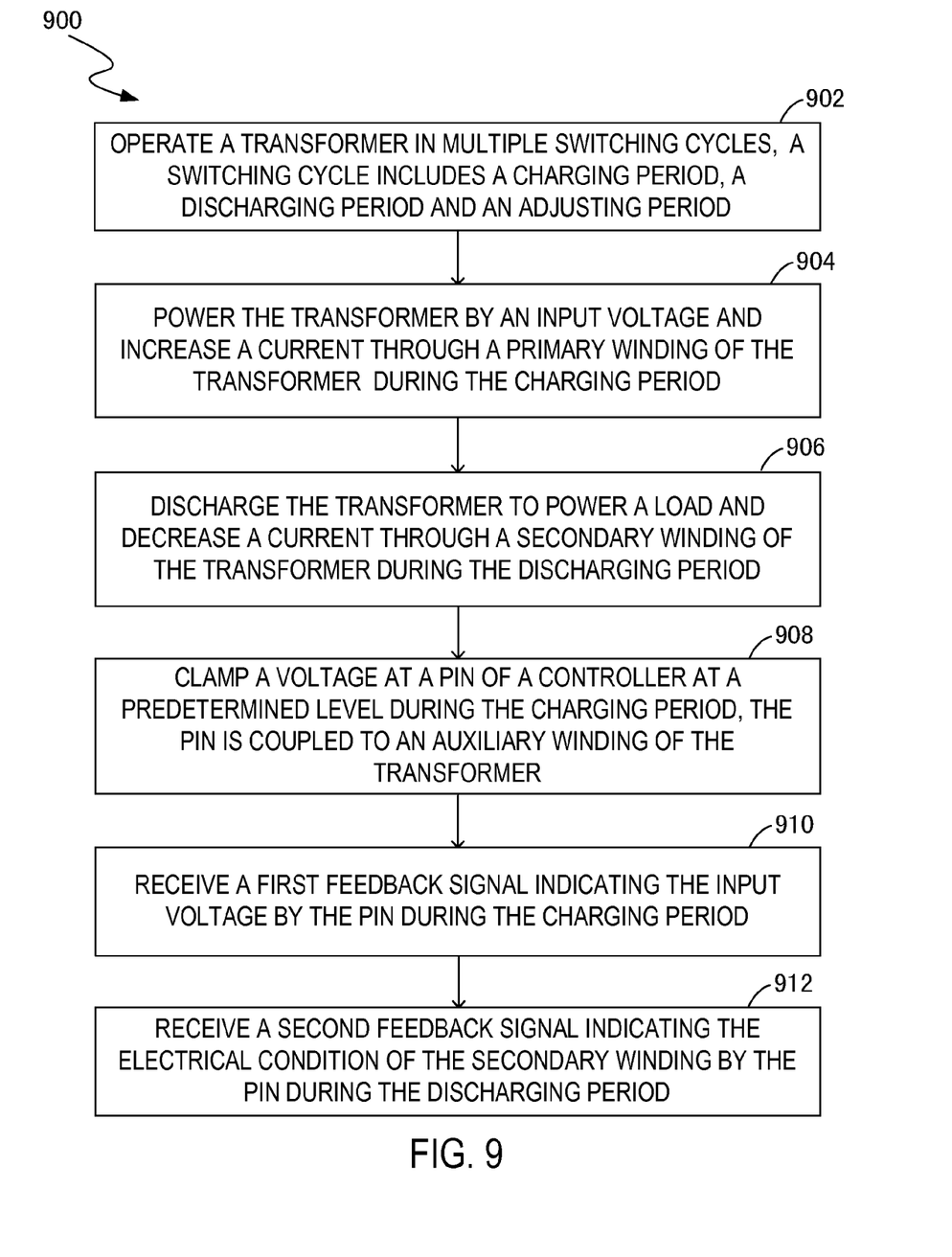
FIG. 9 illustrates a flowchart of operations performed by a circuit for driving a load, in accordance with one embodiment of the present invention.

FIG. 9 illustrates a flowchart 900 of operations performed by a circuit for driving a load, e.g., the circuit 600 for driving the load 212, in accordance with one embodiment of the present invention. FIG. 9 is described in combination with FIG. 6-FIG. 8. Although specific steps are disclosed in FIG. 9, such steps are examples. That is, the present invention is well suited to performing various other steps or variations of the steps recited in FIG. 9.

In block 902, a transformer, e.g., the transformer 202, is operated in multiple switching cycles. A switching cycle includes a charging period and a discharging period. In block 904, during the charging period, the transformer is powered by an input voltage, and a current through a primary winding of the transformer is increased. In block 906, during the discharging period, the transformer is discharged to power the load and a current through a secondary winding of the transformer is decreased.

In block 908, a voltage at a pin of a controller, e.g., the FB pin, that is electrically coupled to an auxiliary winding of the transformer is clamped to a predetermined level such as zero volts during the charging period.

In block 910, a first feedback signal indicating the input voltage is received by the pin during the charging period. In one embodiment, the first feedback signal includes a current flowing through the pin, e.g., the current $I_{FB}$ through the FB pin. In block 912, a second feedback signal indicating an electrical condition of the secondary winding is received by the pin during the discharging period. In one embodiment, the second feedback signal includes a voltage at the pin, e.g., $V_{FB}$ at the FB pin.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A circuit for driving a load, said circuit comprising:
a transformer that comprises a primary winding receiving an input voltage, that comprises a secondary winding coupled to said load, that operates in a plurality of switching cycles, wherein a switching cycle of said switching cycles comprises a charging period and a discharging period, wherein during said charging period said transformer is powered by said input voltage and a current flowing through said primary winding increases, and wherein during said discharging period said transformer discharges to power said load and a current flowing through said secondary winding decreases; and
a controller, coupled to said transformer, that comprises a pin which receives a first feedback signal indicating said input voltage during said charging period and receives a second feedback signal indicating an electrical condition of said secondary winding during said discharging period, that generates a first control signal according to said first feedback signal to regulate said input voltage, and that generates a second control signal according to said second feedback signal to regulate an output current flowing through said load.

2. The circuit as claimed in claim 1, further comprising:
a converter, coupled between a power source and said primary winding, that converts an input alternating current (AC) voltage generated by said power source to said input voltage, and that regulates said input voltage according to said first control signal.

3. The circuit as claimed in claim 1, wherein said transformer further comprises:
an auxiliary winding coupled to said pin of said controller, wherein a voltage across said auxiliary winding is proportional to said input voltage at said primary winding during said charging period.

4. The circuit as claimed in claim 3, wherein said circuit further comprises:
a resistor, coupled between said auxiliary winding and said pin of said controller, wherein said controller clamps a voltage on said pin at a predetermined voltage level during said charging period, and wherein a level of a current flowing through said resistor is proportional to said input voltage during said charging period.

5. The circuit as claimed in claim 1, wherein said transformer further comprises:
an auxiliary winding coupled to said pin of said controller, wherein a voltage across said auxiliary winding indicates whether said current through said secondary winding drops to a predetermined level during said discharging period.

6. The circuit as claimed in claim 1, wherein said first feedback signal includes a current flowing through said pin, and said second feedback signal includes a voltage on said pin.

7. The circuit as claimed in claim 1, wherein said controller further comprises:
a current mirror, coupled to said pin, that mirrors a current through said pin during said charging period to provide a current flowing through a resistor; and a sampling and holding circuit, coupled to said current mirror, that samples and holds a voltage across said resistor to generate a holding signal indicating said input voltage.

8. The circuit as claimed in claim 1, wherein said switching cycle further comprises an adjusting period, and wherein said second control signal regulates said current through said load by controlling a ratio of a duration of said discharging period to a total duration of said charging period, said discharging period and said adjusting period to be substantially constant.

9. The circuit as claimed in claim 8, wherein said controller further comprises:
a current control unit terminating said discharging period and beginning said adjusting period when said second feedback signal indicates that said current through said secondary winding decreases to a predetermined current level.

10. The circuit as claimed in claim 8, wherein said controller further comprises:
a signal generator generating a saw-tooth wave signal,
wherein during said charging period said saw-tooth wave signal increases from a predetermined reference voltage level to a first level,
wherein during said discharging period said saw-tooth wave signal decreases from said first level to a second level, and
wherein during said adjusting period said saw-tooth wave signal increases from said second level to said predetermined reference voltage level.

11. The circuit as claimed in claim 10, further comprising:
a switch coupled in series with said primary winding, wherein said controller turns on said switch when said saw-tooth wave signal increases from said predetermined reference voltage level until said saw-tooth wave signal reaches said first level, and wherein said controller turns off said switch if said current flowing though said primary winding increases to a predetermined peak current level.

12. The circuit as claimed in claim 8, further comprising:
a switch coupled in series with said primary winding, wherein said controller turns on said switch during said charging period and turns off said switch during said discharging period and said adjusting period.

13. A power converter comprising:
a transformer that comprises a primary winding receiving an input voltage, a secondary winding coupled to a load, and an auxiliary winding, that operates in a plurality of switching cycles, wherein a switching cycle of said switching cycles comprises a charging period and a discharging period, wherein during said charging period said transformer is powered by said input voltage and a current flowing through said primary winding increases, and wherein during said discharging period said transformer discharges to power said load and a current flowing through said secondary winding decreases;
a pair of series-connected resistors that is electrically coupled to said auxiliary winding; and
a controller, comprising a pin coupled to a common node of said series-connected resistors, that clamps a voltage on said common node at a predetermined voltage level during said charging period,
wherein a current flowing through said pin is proportional to said input voltage during said charging period, and wherein a voltage at said pin indicates whether said current through said secondary winding decreases to a predetermined level during said discharging period, wherein said controller further comprises:

a current detector, coupled to said pin, that mirrors said current through said pin to provide a current flowing through a resistor during said charging period, and that samples and holds a voltage across said resistor to provide a holding signal,
wherein said controller is configured to generate a control signal based on said holding signal to regulate said input voltage.

14. The power converter as claimed in claim 13, wherein said resistors divide a voltage at said auxiliary winding to provide said voltage at said pin during said discharging period.

15. The power converter as claimed in claim 13, wherein said resistors comprise a first resistor coupled to said auxiliary winding and comprise a second resistor coupled to a node having a reference voltage, and wherein said current of said pin further flows through said auxiliary winding and said first resistor.

16. The power converter as claimed in claim 13, wherein said switching cycle further comprises an adjusting period, and wherein a current through said load is regulated by controlling a ratio of a duration of said discharging period to a total duration of said charging period, said discharging period and said adjusting period to be substantially constant.

17. The power converter as claimed in claim 16, wherein said controller further comprises:
a signal generator generating a saw-tooth wave signal,
wherein during said charging period said saw-tooth wave signal increases from a predetermined reference voltage level to a first level,
wherein during said discharging period said saw-tooth wave signal decreases from said first level to a second level, and
wherein during said adjusting period said saw-tooth wave signal increases from said second level to said predetermined reference voltage level.

18. The power converter as claimed in claim 17, further comprising:
a switch coupled in series with said primary winding, wherein said controller turns on said switch when said saw-tooth wave signal increases from said predetermined reference voltage level until said saw-tooth wave signal reaches said first level, and wherein said controller turns off said switch if said current flowing though said primary winding increases to a predetermined peak current level.

19. The power converter as claimed in claim 16, further comprising:
a switch coupled in series with said primary winding, wherein said controller turns on said switch during said charging period and turns off said switch during said discharging period and said adjusting period.

20. A controller for controlling a transformer which powers a load, said controller comprising:
a first pin that generates a first control signal to regulate an input voltage of said transformer;
a second pin that generates a second control signal to regulate a current flowing through said load, and that enables said transformer to operate in a plurality of switching cycles, wherein a switching cycle of said switching cycles comprises a charging period and a discharging period, wherein during said charging period said transformer is powered by said input voltage and a current flowing through a primary winding of said transformer increases, and wherein during said discharging period said transformer discharges to power said load and a current flowing through a secondary winding of said transformer decreases; and a third pin, coupled to an auxiliary winding of said transformer, that receives a first feedback signal indicating said input voltage during said charging period, and that receives a second feedback signal indicating an electrical condition of said secondary winding during said discharging period, wherein said controller generates said first control signal according to said first feedback signal, and generates said second control signal according to said second feedback signal.

21. The controller as claimed in claim 20, wherein said controller further comprises:

a current mirror, coupled to said third pin, that mirrors a current through said third pin during said charging period to provide a current flowing through a resistor; and a sampling and holding circuit, coupled to said current mirror, that samples and holds a voltage across said resistor to generate a holding signal indicating said input voltage.

22. The controller as claimed in claim 20, wherein said first feedback signal comprises a current flowing through said third pin, and wherein said second feedback signal comprises a voltage at said third pin.

23. The controller as claimed in claim 20, wherein said switching cycle further comprises an adjusting period, and wherein said controller regulates said current through said load by controlling a ratio of a duration of said discharging period to a total duration of said charging period, said discharging period and said adjusting period to be substantially constant.

24. The controller as claimed in claim 23, further comprising:

a signal generator generating a saw-tooth wave signal, wherein during said charging period said saw-tooth wave signal increases from a predetermined reference voltage level to a first level, wherein during said discharging period said saw-tooth wave signal decreases from said first level to a second level, and wherein during said adjusting period said saw-tooth wave signal increases from said second level to said predetermined reference voltage level.

25. The controller as claimed in claim 20, further comprising:

a clamp circuit that clamps a voltage at said third pin at a predetermined voltage level during said charging period.

* * * * *